United States Patent [19]

Lego, Jr.

[11] 4,131,791
[45] Dec. 26, 1978

[54] SEARCH AND LOCATE SYSTEM

[75] Inventor: Louis J. Lego, Jr., Sauquoit, N.Y.

[73] Assignee: General Electric Company, Utica, N.Y.

[21] Appl. No.: 638,565

[22] Filed: Dec. 8, 1975

[51] Int. Cl.² .............................................. H04B 9/00
[52] U.S. Cl. .................................... 250/199; 350/332; 356/152
[58] Field of Search ...................... 356/4, 5, 141, 152; 250/199; 350/160

[56] References Cited

U.S. PATENT DOCUMENTS

| | | | |
|---|---|---|---|
| 3,344,420 | 9/1967 | Arsove | 343/6.5 |
| 3,417,398 | 12/1968 | Lewis et al. | 343/18 C |
| 3,611,277 | 10/1971 | Yoder | 356/5 |
| 3,863,064 | 1/1975 | Doyle et al. | 250/199 |
| 3,893,772 | 7/1975 | Tilly et al. | 356/152 |
| 3,989,942 | 11/1976 | Waddoups | 356/152 |

*Primary Examiner*—S. C. Buczinski

[57] ABSTRACT

A search and locate system includes a search station having an active, low light level electro-optic unit. A search beacon of nonvisible laser radiation is transmitted from the search station. A person to be located has a locator unit including a corner-cube retro-reflector which reflects a portion of the radiation of the search beacon back to the search station where it is detected by the low light level receiving apparatus. The locator unit also includes a photo-detector and indicator which provides a signal when the locator unit is positioned within the radiation from the search beacon. This enables the person utilizing the locator unit to sustain the reflection back to the search station, thus enhancing the likelihood of detection. The locator unit further includes a low power modulation system whereby the person can transmit a message to the search station via the reflected beam. Means are additionally provided for coding the radiation from the search beacon and for detecting a predetermined code at the locator unit. This enables the person using the locator unit to reflectively respond only to a search beacon transmitting radiation with the correct code.

1 Claim, 13 Drawing Figures

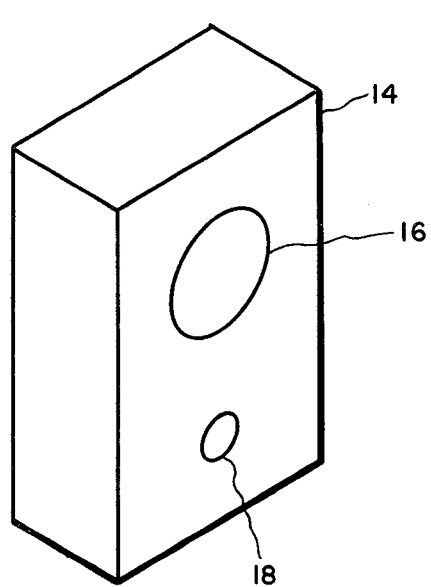
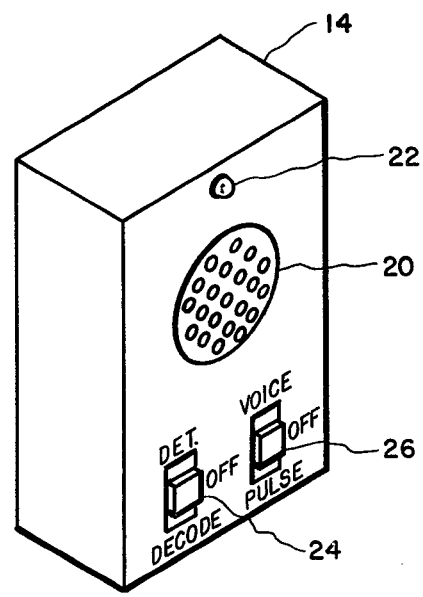
FIG. 2a  FIG. 2b
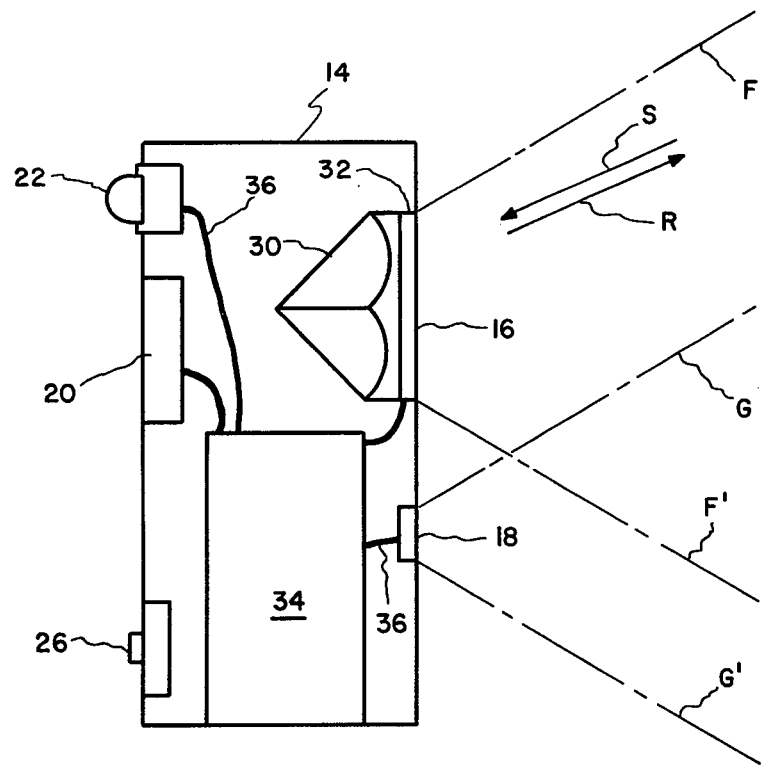
FIG. 3

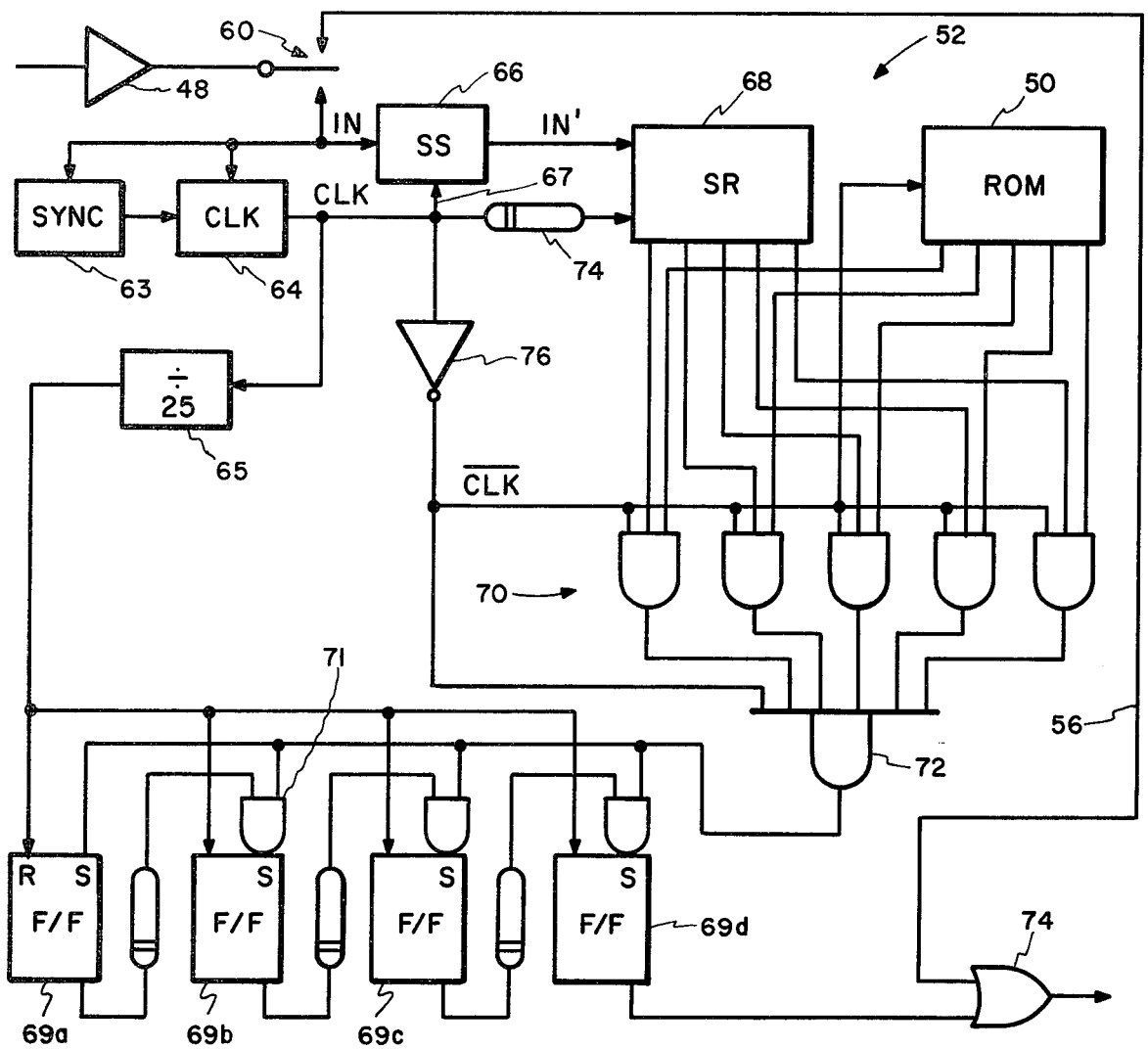
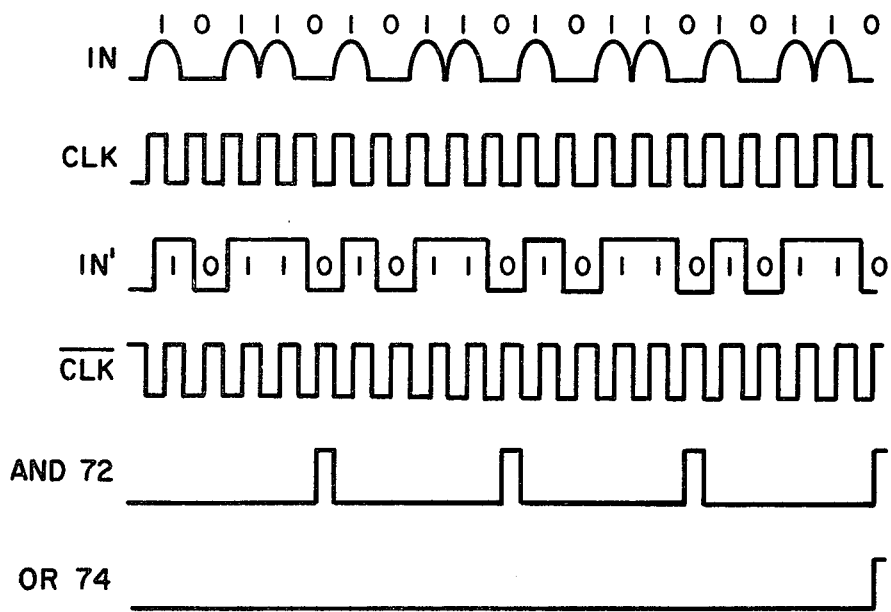
FIG. 5a
FIG. 5b

SEARCH AND LOCATE SYSTEM

BACKGROUND OF THE INVENTION

This invention relates to search and locate systems and, more particularly, to a search and locate system utilizing electrooptic detection means in a manner which facilitates the search and locate process and which provides a high degree of security both for the searcher and for the person being searched for.

Past search and locate systems have been based on the use of omni-directional transmission devices, such as radios, as a locator unit deployed with the person desired to be located. There are several drawbacks inherent in such a system. First, the person desiring to be located has no way of knowing when a searcher is within range of his transmitter and thus, to maximize his chances of rescue, must operate the transmitter for long periods when there are no receivers within range and this is wasteful of the precious power supply available in the locator unit. Further, in a military situation the person desiring to be located, such as a downed pilot, does not want to give his position away to the enemy. Use of a radio transmitter may therefore be highly dangerous in certain situations and in many instances may, in fact, be so dangerous as to preclude use altogether. Also, the use of an active transmitter in the locator unit requires a large power supply and this in turn makes the unit large and cumbersome. Further, omni-directional transmitters are by nature very wasteful of power and very difficult to locate from a single search station such as an aircraft and, at best, can direct the searchers only to a general location rather than to the specific point where the locator unit is positioned.

OBJECTS AND SUMMARY OF THE INVENTION

It is therefore a principal object of the present invention to provide a search and locate system including a locator unit having very low power requirements.

A further object is to provide a system of the type described wherein the locator unit includes means for signaling the user that it is within range of a search station.

A further object is to provide a system of the type described wherein the locator unit produces a highly directional signal which can be detected only at the search station.

Still a further object is to provide a system of the type described wherein the user of the locator unit is able to distinguish between hostile and friendly searchers and wherein the searcher is able to distinguish between hostile and friendly locator responses.

Yet another object is to provide a system of the type described wherein the locator unit incorporates means to enable the user to substantially enhance his chances of being detected by a searcher.

Yet another object is to provide a locator unit for a search and locate system which incorporates such features and advantages as set forth above.

Still a further object is to provide a line of sight communication system which is highly directional and in which a transmitted message can be detected only at the receiving station.

Still another object is to provide a highly directional line of sight communication system wherein the requirements for aligning the transmitter and receiver units are minimal.

Additional objects and advantages of the invention will be set forth in part in the description which follows, and in part will be apparent from the description, or may be learned by practice of the invention. To achieve the foregoing objects and in accordance with the purposes of the invention, as embodied and broadly described herein, the search and locate system of the invention comprises a search station for transmitting radiation from a search beacon, locator means including a retro-reflector for reflecting a portion of the radiation of the search beacon back to the search station, detector means included in the locator means for generating an indication signal in response to the radiation from the search beacon to indicate that the locator means is positioned within the search beacon, and receiving means at the search station for detecting the reflected radiation and for generating a detection output in response thereto.

In accordance with additional aspects of the invention, as embodied and broadly described herein, the locator means may be provided with a shutter device arranged to control the reflection properties of the retro-reflector whereupon the operator of the locator means is provided with the ability to modulate the radiation reflected to the search station. The shutter device may be driven by audio modulation means operable in response to a voice input from the operator or in response to a pulsing circuit for imparting a distinctive, readily detectable characteristic to the reflected radiation. In accordance with still a further aspect of the invention, the locator means may be provided with means for demodulating the signal received from the search station whereupon the operator of the locator means is better enabled to ascertain the identity of those broadcasting the search beacon and is thus able, if he so desires, to withhold operation of the retro-reflector so as not to reveal his presence.

These and other objects, features and advantages will be made apparent by the following detailed description of a preferred embodiment of the invention, the description being supplemented by drawings as follows.

BRIEF DESCRIPTION OF THE DRAWINGS

FIGS. 2a and 2b are front and rear views, respectively, of the locator unit utilized in the system of the invention.

FIG. 3 is a side elevation view of the locator unit wherein the side cover is removed to illustrate the internal components.

FIG. 5a is a schematic diagram showing the demodulator portion of the circuit of FIG. 4.

FIG. 5b is a waveform diagram useful in understanding the operation of the demodulator circuit shown in FIG. 5a.

FIG. 9a is a schematic diagram of the clock circuit shown in FIG. 5a.

FIGS. 9b and 9c are waveform diagrams useful in understanding the operation of the circuit of FIG. 9a.

DETAILED DESCRIPTION OF EMBODIMENT

Figure 1:
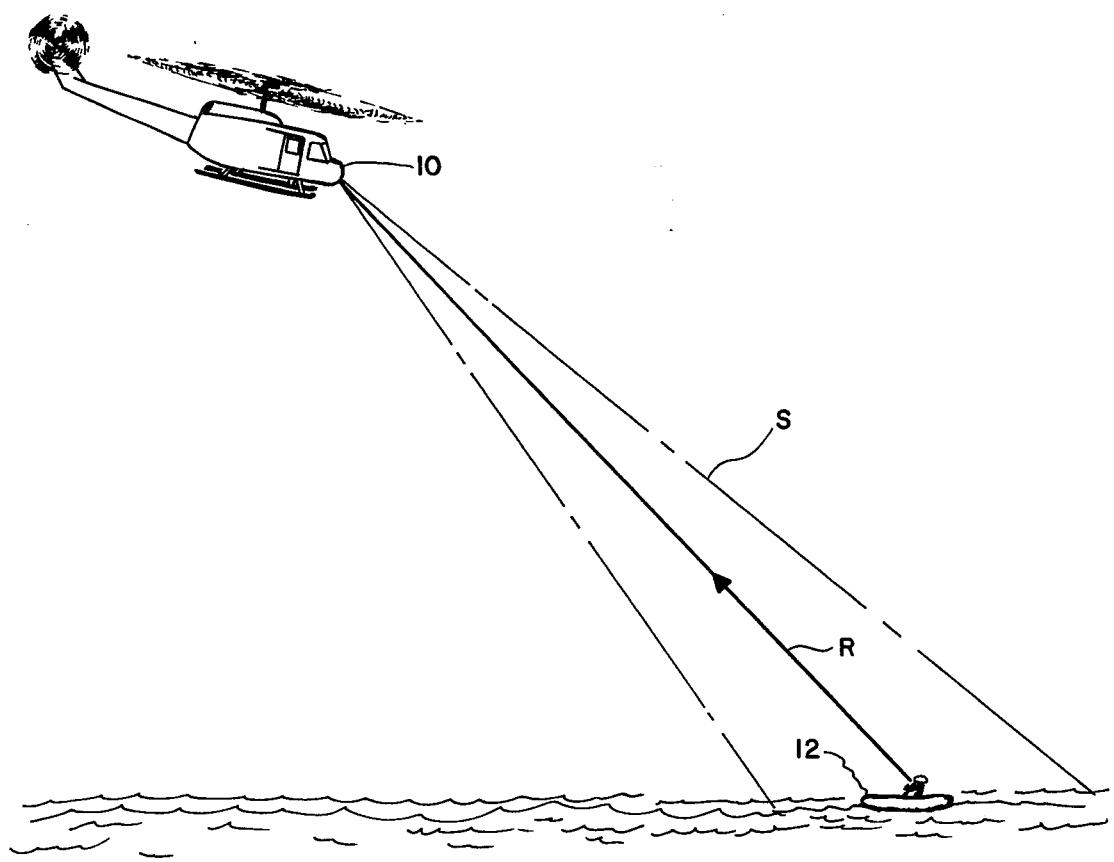
FIG. 1 is a schematic diagram illustrating the use of the invention in a search and locate system.

FIG. 1 illustrates the general environment of a search and locate system in accordance with the invention. A search station such as helicopter 10 or other relatively low speed aircraft transmits radiation from an optical search beacon S which may, for example, be a beam of covert (not visible to the unaided eye) laser radiation pulsed at a repetition rate of 15 KHz. The radiation from beacon S is made to cover a relatively wide area and may be made to diverge at, for example, 20°. A person in a liferaft 12 desiring to be located utilizes the locator unit hereinafter described for directing a portion of the radiation of the search beacon back to the search station in a reflected beam R. Because the locator unit utilizes a corner-cube retro-reflector, alignment of the unit is not critical and the reflected beam R will be directed exactly back to the source of the search beacon so long as the operator keeps the locator unit pointed in the general direction of the search station.

FIGS. 2a and 2b illustrate the locator unit. The unit 14 has a front face including a transparent window 16, behind which the retro-reflector is mounted and an aperture 18 for exposing a photodetector cell to the radiation of the search beacon. The rear panel of the unit (FIG. 2b) includes a microphone 20, a detector signal light 22 and a pair of control switches 24 and 26. Signal light 22 provides a visual indication to the operator that the locator unit is within the radiation from the search beacon. Control switch 24 is a three-position momentary contact switch which enables the operator to control the search beacon detector circuit. When in the center "off" position switch 24 disconnects the power supply from the detector circuit to eliminate power drain. When in the upper "detect" position the detector circuit is conditioned such that it will illuminate the signal light 22 whenever the locator is positioned within any radiation from the search beacon of the proper wavelength characteristics. The lower "decode" position of switch 24 switches the detector circuit to a mode of operation whereby signal light 22 will be illuminated only if the radiation from the search beacon is pulse-modulated in accordance with a predetermined pulse code.

Control switch 26 is also a three-position momentary contact switch. This switch enables the operator to activate the retro-reflector to reflect a beam back to the search station. When in the center "off" position switch 26 disconnects the reflector control circuit from the power supply to eliminate power drain. When in the upper "voice" position, switch 26 causes the reflector control circuit to modulate the reflected beam in accordance with an audio input provided by the operator through microphone 20. When in the lower "pulse" position, switch 26 deactivates the audio portion of the control circuit and causes the reflected beam to be modulated in accordance with a low frequency, repetitive pulse pattern which enables the receiver unit at the search station to more readily detect the reflected beam.

The internal arrangement of the locator unit is shown in FIG. 3. Retro-reflector 30 and control shutter 32 are mounted on the front face of the unit behind a filter window 16. The filter window restricts light incident on the retro-reflector to a narrow spectral pass band centered at the illuminator wavelength. An electronic control circuit and power supply unit 34 is connected via conductors 36 to the photodetector unit 18, signal light 22, microphone 20 and to switches 24, 26 mounted on the rear panel of the locator unit. The entire unit 14 may be constructed in a compact package approximately 2 inches × 2 inches × 5 inches which is light weight and easily handlable by a single operator.

The retro-reflecting prism 30 may be constructed in the manner of a conventional corner-cube prism which totally internally reflects incident radiation S back out of the prism along a path R which is parallel and substantially coincident with the beam S. As shown in FIG. 3 the field of view of the prism 30, which is defined by lines F and F', is relatively wide, being on the order of 40°. It is desirable that the field of view (lines G, G') of the aperture 18 of the photodetector unit be substantially the same as the field of view for the reflector prism. This insures that the photodetector circuit will illuminate signal light 22 only when the retro-reflector 30 is in position to reflect radiation back to the search station.

Figure 4:
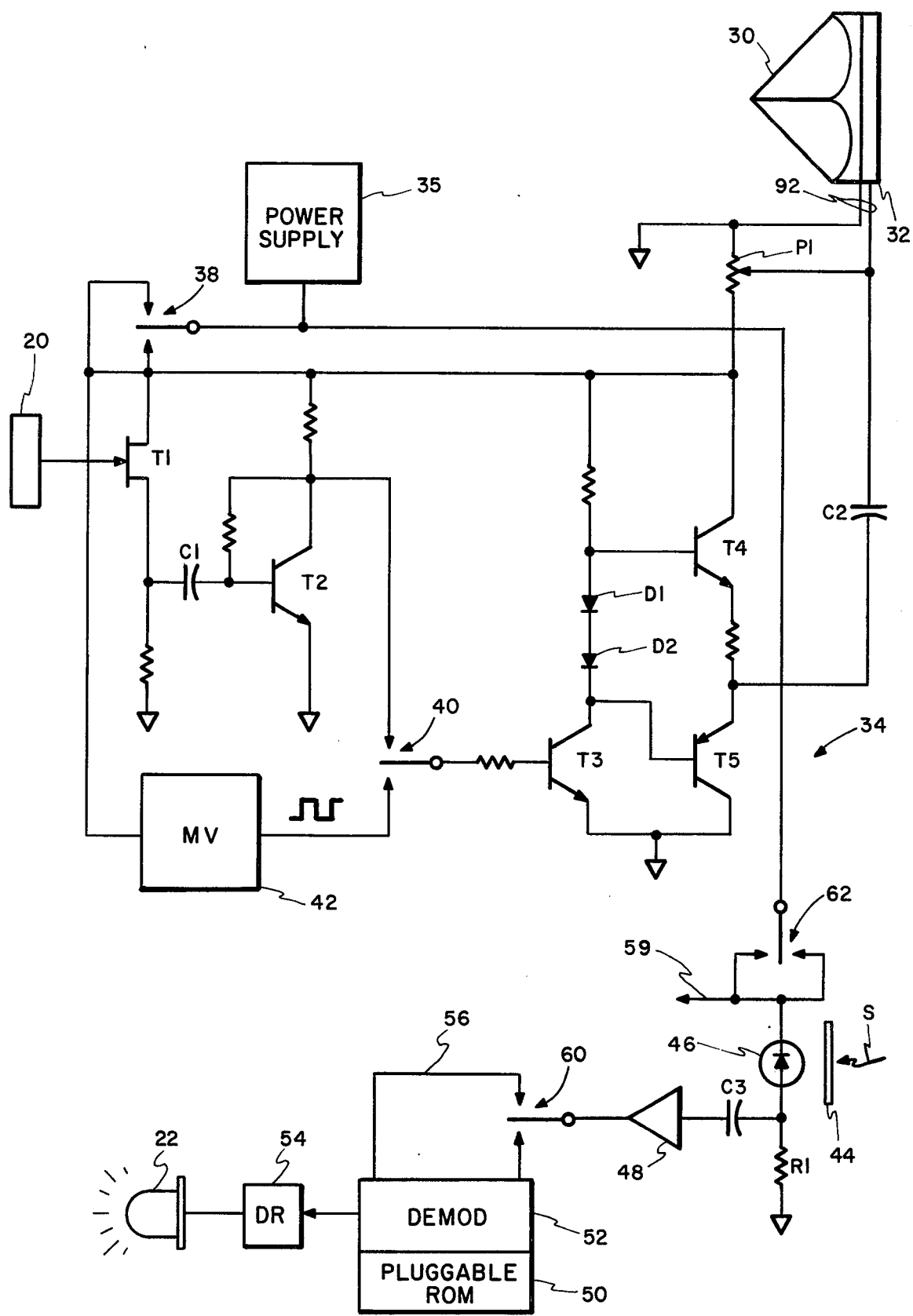
FIG. 4 is a schematic diagram illustrating the electronic circuit portion of the locator unit.

FIG. 4 illustrates the details of electronic circuit unit 34. Power for the unit is supplied by power supply 35 which may comprise, for example, a conventional 22.5 volt battery. The reflection control shutter 32 is electrically controlled by a circuit including an input amplifier stage T1 which may, as shown in FIG. 4, comprise a field effect transistor having its gate connected to receive an audio input signal from microphone 20. The output stage of the circuit includes a pair of complementary emitter-followers T4 and T5 connected to supply control voltage via a coupling capacitor C2 to a pair of electrode control terminals 92 of the shutter 32. A second stage input amplifier T2 is AC coupled via capacitor C1 to input stage T1 and supplies an audio signal to intermediate stage amplifier T3 via control contacts 40. Diodes D1 and D2 provide for proper quiescent operation of the output stage so that maximum bipolar voltage swing can be maintained with low crossover distortion.

An alternative input to intermediate stage amplifier T3 may be provided by a free-running multivibrator circuit 42. The latter produces a squarewave output signal which may, for example, have a repetition rate on the order of 4 or 5 Hz. This low frequency pulse input signal may be selected in lieu of the audio signal by operation of switch contacts 40. The latter is operated in tandem with the contact set 38 by control switch 26 (FIG. 2b). Thus, when the latter controls contacts 38 and 40 such that they are in their upper position, the audio input signal from microphone 20 is coupled to input terminals 92 of the reflection control shutter 32. When the switch is in its lower position, contacts 38 and 40 connect the multivibrator 42 such that it supplies the input to the shutter terminals. Of course, when switch 26 is in its center position, contacts 38 and 40 are in the position shown in FIG. 4 whereby power supply 35 is completely disconnected from the shutter control circuit.

The search beacon detector circuit is shown in the lower portion of FIG. 4. A photodiode 46 is positioned to be exposed to radiation through aperture 18 in the front panel of the locator unit. A spectral filter element 44 is placed in front of the photo diode so that the latter responds only to radiation having a wavelength similar to that of search beacon S. The output from photodiode 46 is coupled to the signal light control circuit through a high-pass filter C3-R1. This filter passes an input to amplifier 48 only in response to frequencies above the 15 KHz. repetition rate of the pulsed search beacon. This prevents low frequency or constant ambient illumination from activating signal light 22.

Input amplifier 48 feeds the photodiode output signal to the signal light driver circuit 54 via either a direct path 56 or via a demodulator circuit 52. Selection of the path is determined by the setting of switch contacts 60. These switch contacts are operated in tandem with contacts 62 by control switch 24 (FIG. 2b). When the latter is in its upper "detect" position contact set 60 is also in its upper position such that the output from amplifier 48 is coupled to driver 54 in essentially a straight-through connection. When control switch 24 is in its lower "decode" position, contact set 60 is also in its lower position such that the signal from input amplifier 48 is fed to the demodulator circuit 52. This circuit detects the presence of a predetermined pulse code modulation in the radiation from the search beacon S such that signal light driver 54 is activated only upon detection of the correct pulse code. A pluggable read only memory (ROM) unit 50 functions to supply interchangeable pulse codes to the demodulator 52. This permits the locator unit to be easily "programmed" to respond to different codes. As will be explained hereinafter, this feature is extremely useful in a secure environment when the user of the locator unit desires to respond with his retro-reflector only to the radiation from a search beacon which he knows is coming from a friendly searcher.

The details of the demodulator circuit 52 are illustrated in FIG. 5a. Amplifier 48 couples an input signal IN through contact set 60 to a retriggerable single-shot 66, a sync detector 63 and a clock circuit 64. Sync detector circuit 63 responds by producing an output pulse SYNC each time it detects a train of six consecutive one-bit pulses in the IN signal. The SYNC pulse is generated coincident with the start of the sixth one-bit (see FIG. 9b). Clock circuit 64 produces a squarewave output signal CLK which is used to time the operation of the demodulator. The clock 64 includes a retriggerable oscillator which is controlled by a timing circuit which responds to each SYNC pulse to restart the oscillator such that the phase relationship between the pulse modulated input signal IN and the squarewave signal CLK is maintained substantially as shown in FIG. 5b. Depending on the phase drift tolerances of the oscillator circuits used in the system, groupings of six consecutive one-bits should be interspersed in the search beacon at frequent enough intervals such that the IN and CLK signals cannot drift more than approximately a quarter cycle apart.

Single-shot 66 is triggered each time the IN signal rises above a predetermined threshold level during the period that signal-shot 66 is gated by a high level CLK signal on line 67. The output of the single-shot is a low-high-low pulse of duration substantially equal to the period of the CLK signal.

Thus, pulse code modulation of the search beacon results in reproduction of the pulse code data in a signal IN' appearing at the output of single-shot 66. As shown in FIG. 5b, such pulse code modulation takes the form of a binary sequence which is varied in accordance with a repetitive five digit code. The code sequence 10110 is shown as an example. In the present embodiment, this modulation may have a repetition rate equal to the pulse frequency of the radiation from the search beacon (15 KHz.). The repetitive pulse code sequence thus reproduced at the output of single-shot 66 (FIG. 5b, signal IN') is fed to the input of a shift register 68.

Data bits are shifted through shift register 68 in response to the CLK signal which acts on the shift-control input of the register through a delay element 74. The register is caused to shift its data one position to the right for each positive-going shift in the CLK signal. The delay element 74 is provided to permit the output from detector single-shot 66 to settle out prior to operation of the shift register.

After each new data bit has been entered into the shift register, the ROM unit 50 is accessed by the CLK signal acting through an inverter 76 and the binary data pattern stored in the ROM is presented at its outputs. The outputs from shift register 68 and ROM 50 are compared by a series of five AND circuits 70. The outputs from the AND circuits are fed into AND circuit 72 along with the output from inverter 76. Thus, AND 72 produces an output signal each time the pattern of data bits stored in shift register 68 matches the pattern of data bits stored in ROM 50. Output pulses from AND 72 are fed into a digital integrating network comprising four flip-flops 69a-69d and the output therefrom is applied through an OR circuit 74 to the signal light driver circuit 54.

Referring to FIG. 5b, the pulse coded input signal IN is decoded by single-shot 66, resulting in a train of data bits being shifted through shift register 68. As each new combination of outputs is presented at the outputs of the shift register, AND circuits 70 compare that data with the bit pattern from ROM 50. When IN is encoded in accordance with the repetitive five-bit code sequence 10110, AND 72 generates an output pulse in coincidence with every fifth CLK pulse (FIG. 5b). The outputs from AND 72 operate to cause the flip-flops 69a-69d to be set in sequence such that it takes at least four outputs from AND 72 to energize the signal light. The first output sets flip-flop 69a and that in turn partially conditions AND 71 which feeds the set input of flip-flop 69b. The next output from AND 72 sets flip-flop 69b and that in turn conditions flip-flop 69c. After four outputs from AND 72 flip-flop 69d sets and produces an output through OR 74 (see FIG. 5b). After each 25 CLK pulses a frequency divider circuit 65 resets all the flip-flops so that the signal from OR 74 terminates and the process starts over. Thus, if AND 72 produces a continuous train of outputs, the signal light driver is turned on for 21 out of every 25 CLK pulses and this effectively maintains full illumination of the signal light whereupon detection of the search beacon at the locator unit is signalled to the operator. However, if only occasional outputs are generated by AND 72 the output from OR 74 will not be sufficiently continuous to result in noticeable illumination of the light.

In order to utilize a different pulse code to activate the signal light, all that is necessary is to remove the pluggable ROM unit 50 and replace it with a unit programmed to store a different code. While the embodiment illustrated incorporates a five bit code it can be readily understood that the circuit could be designed without unduly increasing its size or complexity to accommodate a much longer code sequence, e.g. 100 bits.

Figure 9A:
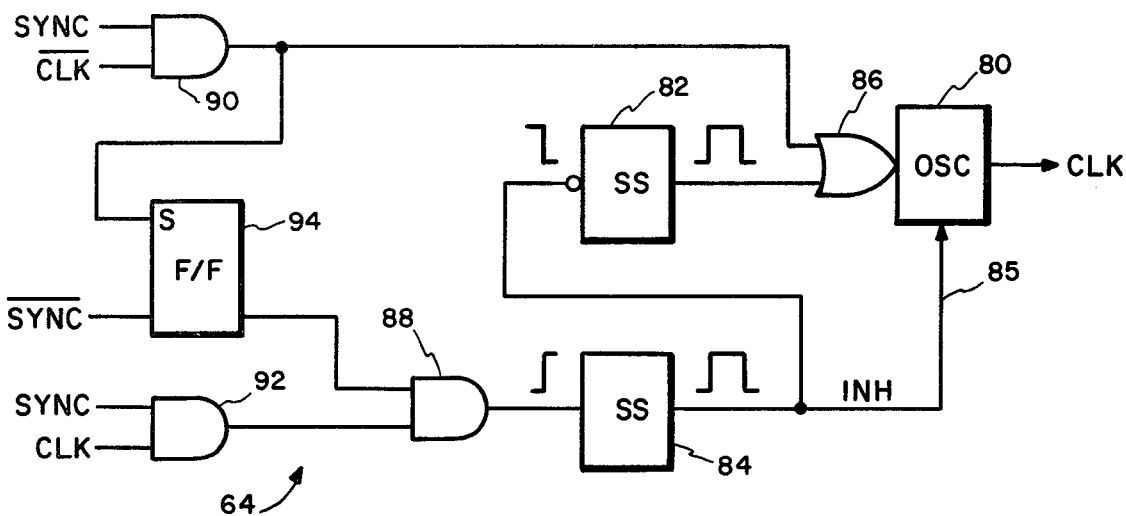
Figure 9B:
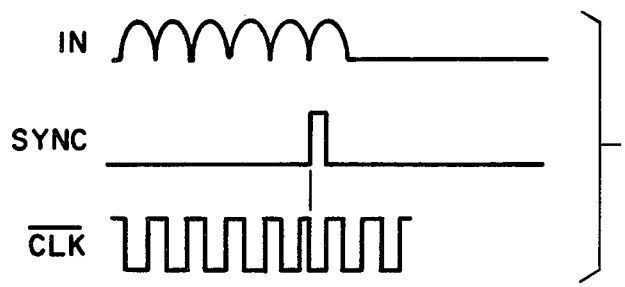

FIG. 9a shows the clock circuit 64. A retriggerable, free-running oscillator 80 operates to produce a continuous squarewave output signal CLK. Oscillator control inputs are provided through an OR circuit 86 and via an inhibit input in H fed on line 85. A positive-going shift from OR 86 operates to instantaneously reverse the state of the oscillator. Thereafter, the squarewave output continues at its set frequency. An inhibit input on line 85 operates to interrupt the oscillator cycle and hold the output at its then-current state for so long as the inhibit input is present.

An AND circuit 90 provides an output whenever SYNC occurs while CLK is high. This is an indication that the CLK and IN signals are out of phase with the IN signal having been shifted in a leading direction. Under normal in-phase operation the leading edge of the SYNC pulse will occur substantially coincidently with a positive shift in CLK, and thus AND 90 is not energized. However, under out-of-phase conditions the output from AND 90 sets a flip-flop 94 and operates through OR 86 to cause the CLK signal to shift positive (CLK shifts negative). This is illustrated in the waveform diagram of FIG. 9b. Thereafter, CLK is in the proper phase relationship illustrated in FIG. 5b. Flip-flop 94 operates to decondition AND 88 during the presence of SYNC; so that the ensuing positive shift in CLK does not trigger single-shot 84 (SYNC still being high). When SYNC shifts negative, flip-flop 94 resets.

Figure 9C:
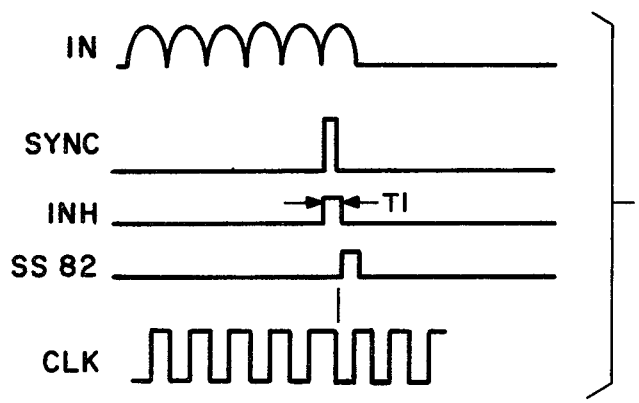

AND 92 provides an output whenever SYNC comes up either concurrently with CLK or while CLK is already high. The former condition indicates in-phase operation while the latter condition indicates out-of-phase operation with the IN signal having been shifted in a lagging direction. The output from AND 92 is gated through AN 88 (flip-flop 94 being in the reset state) and triggers single-shot 84. The latter is set to generate an output pulse INH which has a width T1 (FIG. 9c) exactly one-half the period of oscillator 80. The INH pulse interrupts the oscillator cycle and holds the CLK signal high as shown in FIG. 9c. Thereafter, when single-shot 84 times out, the inhibit input terminates and at the same time a trailing-edge single-shot 82 is energized to feed a pulse through OR 86 that causes the oscillator to reverse states whereupon CLK shifts negative. The CLK signal thereafter continues at its set frequency and is properly phased with respect to the IN signal. This is illustrated in FIG. 9c. It is noted that single-shot 84 operates if CLK and IN are out of phase (with IN lagging) or if they are in phase. In either event the CLK signal ends up properly phased.

Therefore, clock circuit 64 operates through AND 90 to correct the phase of CLK when IN has shifted in a leading direction and operates through AND 92 to correct the phase of CLK when IN has shifted in a lagging direction.

Clock circuit 64 can also; be fabricated using a voltage controlled oscillator and a phase comparator. The latter is arranged to compare the repetition rate of the SYNC pulses with the CLK signal and operates to vary the oscillator control voltage to adjust the CLK frequency whereby synchronization is maintained.

Figure 6:
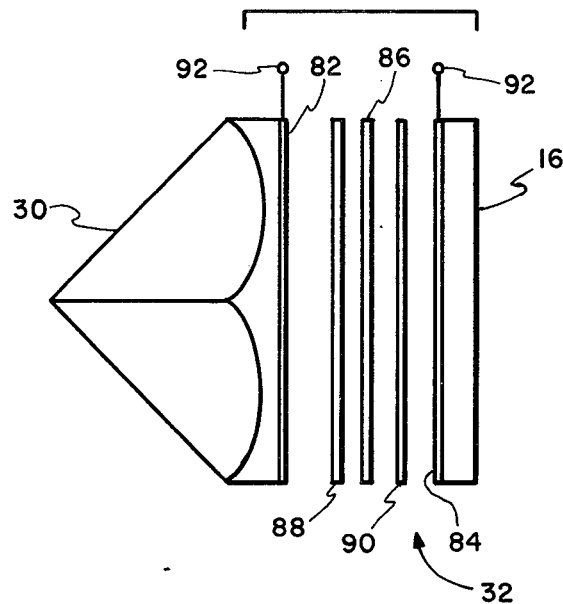
FIG. 6 is an exploded view illustrating one form of construction of the retro-reflector prism and modulating shutter used in connection with the invention.

The construction of the retro-reflector prism 30 and its associated controllable shutter is illustrated in FIG. 6, which shows an exploded view of the assembly. Prism 30 is a so-called corner cube prism having reflective surfaces formed in three mutually perpendicular planes. Radiation admitted through the flat face of the prism is totally internally reflected from the reflection surfaces and exits the prism along a path parallel to and approximately coincident with that on which it entered. This holds true for radiation entering the prism at any angle of incidence within the field of view of the prism. As previously mentioned, the field of view can be relatively wide, i.e. on the order of 40°.

The electrically controllable shutter 32 may be constructed in a variety of ways. The construction illustrated in FIG. 6 employs a pair of transparent, conductive electrodes 82 and 84 deposited respectively on the front face of prism 30 and on the rear face of filter window 16. These electrodes are connected to terminals 92 which tie the electrodes into the control circuitry. Sandwiched between the electrodes are a pair of polarization filters 88 and 90 and, in the center, a layer of material 86 is provided which acts under the influence of an electric field to rotate the plane of polarization of radiation passing through it. Materials known to have such properties are field effect liquid crystals such as N-(p-Methoxybenzylidene)-p-butylaniline ("MBBA") and the ceramic material PLZT. Filters 88 and 90 can be oriented with their polarization planes at right angles to each other so that under conditions of no signal at terminals 92 no light passes through the shutter. It is important that the shutter operate in this fashion in system applications which demand security since it gives the operator the option of responding to the radiation from a search beacon or not responding, depending on whether he believes the radiation from the beacon to be emanating from a friendly or hostile source.

An alternate construction for the shutter 32 employs in the position of layer 86 an electrically responsive light scattering material such as a nematic dynamic scattering liquid crystal mixture. This eliminates the need for polarization filters 88 and 90. A possible disadvantage of the use of this type of material lies in the fact that its light scattering effects are produced only when a potential difference is present across the control electrodes. This means that in order to operate on a no-signal/non-reflection basis power from the battery must be consumed when the retro-reflector is in the off (non-reflecting) condition. This can be remedied, however, by providing a mechanical shutter or cover over window 16 which can be manually removed when it is desired to activate the reflector.

Figure 7:
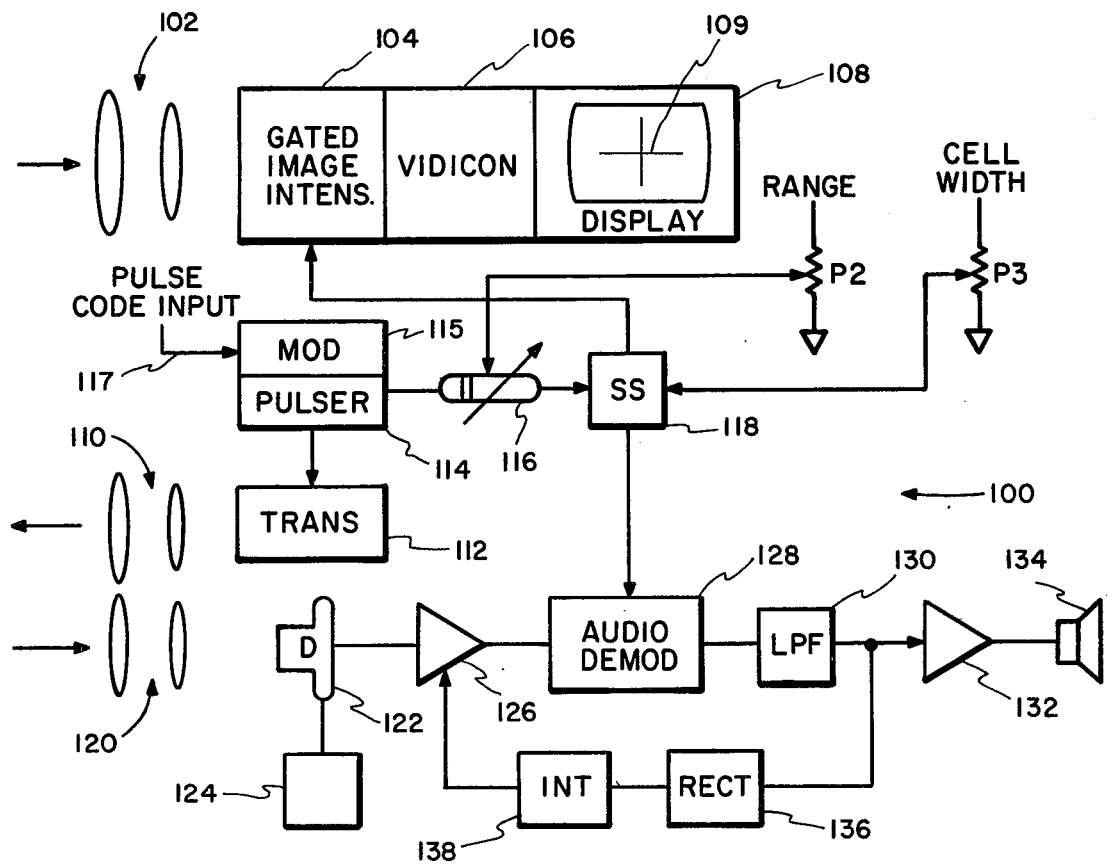
FIG. 7 is a block diagram illustrating the receiver unit used at the search station in accordance with the invention.

The optical transmit-receive system used at the search station is illustrated in the block diagram of FIG. 7. A transmitter 112, which may be a laser light source, is controlled by a pulser 114 to emit a continuous train of light pulses through lens system 110. This beam of pulsed transmitted energy forms the search beacon. As previously indicated, the lens system 110 preferably shapes the beam to diverge at an angle of 20° or greater so that a substantial search area can be covered in a single sweep of the beam. In accordance with conventional design, pulser 114 may activate the transmitter 112 at a 15 KHz. repetition rate.

Reflected portions of the radiation from the search beacon are received through the lens system 102 and detected in a conventional low light level receiving system including a gated image intensifier 104, vidicon 106 and TV display monitor 108. The field of view of lens system 102 substantially corresponds with that of lens system 110 so that the scene displayed on monitor 108 represents substantially the full area illuminated by the radiation from the search beacon.

In order to enhace the sensitivity of the receiving system, range gating is employed. This is a well known technique whereby the image intensifier 104 is gated "on" only during the time that reflected radiation is being received from a range cell of interest. By so controlling the receiver, the signal to noise ratio is greatly improved. Radiation back-scattered into the receiver from scattering souces located near the transmitter is eliminated and essentially only that radiation which is of interest to the viewer is displayed. The range gating system employs a variable delay element 116 and a controllable-width single shot multi-vibrator 118. The delay of element 116 is controlled by a "range" signal generated by a manually operable potentiometer P2 and the width of the signal produced at the output of single-shot 118 is controlled by a "cell width" input generated by manually operable potentiometer P3.

After each pulse of light is produced by transmitter 112 under the control of pulser 114, single-shot 118 generates an output pulse which gates the image intensifier 104 "on". The reflected radiation from that light pulse which is displayed on the monitor 108 is that radiation which is reflected by objects located at a distance from the transmitter equal to the distance which the transmitted light travelled during one-half the delay period of variable delay element 116. In other words, during the delay period of element 116 the transmitted light pulse travels to the range cell of interest and radiation reflected from objects within that range cell travels back to the receiver and is detected during the time that the image intensifier is gated on.

The width of the pulse generated by single-shot 118 controls the duration of the gate. Thus, the longer the gate, the greater will be the depth of the scene displayed on the monitor. Both the range gate delay interval and the range gate duration interval are controllable by the operator through potentiometers P2 and P3.

The transmitter 112 and camera portion including at least the image intensifier 104 and vidicon 106 are mounted on a movable platform so that the radiation from the search beacon may be scanned over a wide area. This may be done automatically through the use of servomechanisms or it may be left to the manual control of an operator. Mounted on the same platform in close proximity to the transmitter is an optical detector unit including a lens system 120, an avalanche photodiode detector 122, temperature compensated power supply 124 and transimpedance amplifier 126. The field of view of lens system 120 is relatively narrow so that it receives radiation reflected only from objects which are illuminated essentially by the center portion of the search beacon. The output of amplifier 126 is fed to an audio demodulator 128, which is also range-gated under control of the output from range-gate single-shot 118. The output from demodulator 118 is fed to an audio demodulator 128. The output from demodulator 128 is passed through a low pass filter 130 and audio amplifier 132 to a speaker 134. The output from the low pass filter 130 is also fed back through a rectifier 136 and integrator network 138 to control the gain of amplifier 126.

The purpose of the system including photo-diode detector 122 is to detect and demodulate radiation reflected from a locator unit so that audio messages transmitted by the operator of the locator unit can be received at the search station. The gain control feed back circuits 136 and 138 are required to control the gain of amplifier 126 when an audio signal is being received. This greatly enhances the dynamic range of the system in that the initial gain of amplifier 126 can be made very high to detect weak signals from a remote point. Use of the feedback control prevents stronger returns from saturating the amplifier.

A modulator 115 is provided to turn the pulser 114 on and off in accordance with a binary pulse code input supplied on line 117. This allows pulse code modulation of the radiation from the search beacon as is required for operation in field-secure system applications.

OPERATION

Referring now to FIGS. 2a, 2b and 7, operation of the invention in accordance with an exemplary system application is hereinafter described. A mobile e.g., airborne, search station including the transmit-receive system shown in FIG. 7 travels over an area which is to be searched. Transmitter 112 illuminates the area with the radiation from a search beacon and an operator at the search station monitors the display unit 108 for optical returns representing possible reflections from a locator unit. At this time the search operator would have the range control potentiometers P2 and P3 set to cover a broad field so that the monitor screen displays a full scene covering a wide search area.

A person on the ground desiring to be located periodically scans through a full circle with the front panel of the locator unit slanted in an upward direction and with switch 24 set to its upper "detect" position. If at any time during such a scan the signal light 22 is illuminated, the person knows that he has scanned into the radiation from a search beacon and notes the general direction of the locator unit which produced illumination of the signal light 22. The operator of the locator unit then concentrates his scan to a smaller area in an attempt to illuminate the signal light on a continuous basis and at the same time positions switch 26 to its lower "pulse" position.

The search operator viewing the display monitor 108 will observe a strong return "blip" on the monitor in response to the reflection from the locator unit. Further, the blip will pulsate at the frequency of the pulsing circuit of the locator unit and such pulsations will readily enable the search operator to distinguish the locator return from other reflections which may be displayed on the monitor at that instant.

The search station operator at this time points the receiving system platform in a direction such that the pulsating blip is centered on cross hairs 109 of the monitor screen. By holding the scan platform in a position to maintain the blip on the cross hairs, the exact direction to the locator unit is ascertained. Further, by manipulating range control potentiometers P2 and P3, the operator can also determine, within a few yards, the exact distance to the locator unit.

When the search station operator trains the scan platform to continuously display the locator reflection in the center of the display screen, the radiation from the search beacon will continuously illuminate the locator unit. The person on the ground will thus be able to observe continuous illumination of the signal light 22 on his locator unit. At this point he can position switch 26 to its upper "voice" position and talk into microphone 20 whereupon photodetector 122, which is now in a position to receive the reflected radiation from the locator unit, feeds the modulated reflection through demodulator 128 and the message conveyed by the person on the ground can be heard by the search station operators. This communicatin capability is extremely useful in conveying information that will more readily enable the searchers to pinpoint the position of the locator unit. Also, the person on the ground can convey information as to his identity, condition, etc. to those in the search station.

It will be noted that a feature of the system is that the main power requirement is in the transmit-receive unit carried in the search station. The power required in the locator unit is minimal and such unit may therefore be constructed in much the same manner as a transistor radio, utilizing low-power integrated circuits and a small, conventional battery power supply. Furthermore, the controls provided on the locator unit enable the operator to minimize the power drain by keeping the unit turned off when he knows that he is not within range of a search aircraft. He can periodically conduct a quick 360° scan with switch 24 set to "detect" to determine whether a search aircraft is anywhere in the area. When he detects a search aircraft by this method or by sight or by sound, he need only point the locator unit in the general direction of the aircraft to ascertain whether it is indeed a search unit and to activate his reflector so that the search unit will pick up his signal. As the search aircraft moves through the area, the person utilizing the locator unit can, by observing the condition of indicator light 22, move the locator unit in appropriate fashion to sustain the beam of reflected energy back to the aircraft.

For use in military environments where the person using the locator unit has to be concerned with whether the searcher is friend or foe and where the search personnel have the same concern about the persons operating the reflector unit, the system, through provision of the decode feature and the audio modulation capability, enables secure operation. When, for example, a downed pilot detects the radiation from a search beacon with his locator unit, he can test the beacon by positioning control switch 24 in its lower "decode" position. If the signal light 22 continues to illuminate, he knows that the radiation from the search beacon is being modulated in accordance with the correct code and thus has a greater degree of assurance that he can safely open his retroreflector to respond to the beacon. By the same token, the personnel in the search aircraft can be asssured of the identity of the person on the ground through use of a password which is conveyed over the aduio channel. The use of the pluggable ROM in the locator unit readily allows changing of the pulse code on a day-to-day or mission-to-mission basis.

For operation in a non-hostile environment, it may be desirable to tie the functions of control switches 24 and 26 together so that when the operator of the locator unit turns on the detector circuit to search for indications of the radiation from the search beacon, the pulse control to the reflector shutter is automatically achieved. While this would tend to draw more power from the battery, it would somewhat improve the likelihood of the locator unit being detected at the search station since the instant that the locator unit came within the radiation from the search beacon, a return signal would be displayed on the monitor.

It may be desirable to increase the field of view of the reflector prism 30 and photo-detector aperture 18 so that, for example, a full hemisphere could be scanned in a single positioning of the locator unit. This could be done by use of multiple reflectors and photo-detectors or by use of an appropriate lens system.

Figure 8:
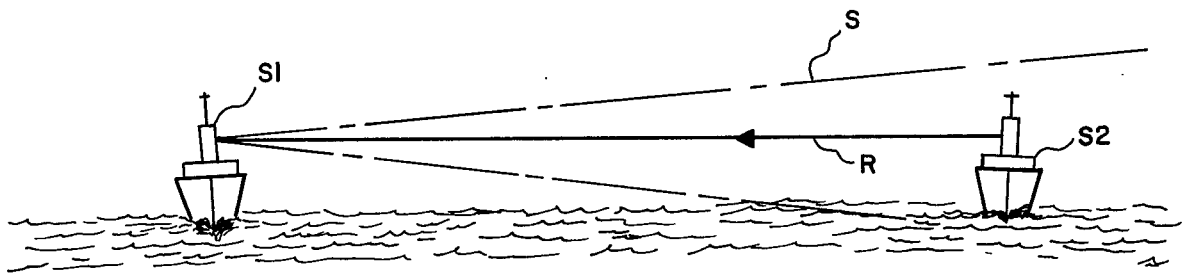
FIG. 8 is a schematic diagram illustrating the use of the invention in a line of sight communication system.

FIG. 8 illustrates an additional application in which the system of the invention can be utilized for line of sight communications between relatively moving objects such as ships S1 and S2. Normally, the use of a highly directional optical beam for communication between such vehicles would require a complex beam alignment system to keep the narrow optical beam trained on the receiver despite the roll and pitch of the ships. However, by utilizing the system of the present invention, it is necessary only that the ship receiving the message, such as ship S1, direct a beam of radiation S in the general direction of the ship which is transmitting the message. By utilizing a unit similar to the above-described locator unit, the message sending ship S2 may send a highly directional reflected beam R bearing the transmitted message. As long as the reflecting unit stays within the beam S, the message signal will remain aimed in the exact direction necessary to keep it trained on the receiver located at ship S1. This is a highly secure ship-to-ship communication system inasmuch as all the energy in the reflected beam R is collected at the receiver and thus the message is not susceptible to interception. Portions of the beam S which pass beyond ship S2 do not convey data and thus interception of that signal is not critical.

It will be appreciated that various changes in the form and details of the above-described preferred embodiment may be effected by persons of ordinary skill without departing from the true spirit and scope of the invention.

I claim:

1. In a search and locate system wherein a search station transmits radiation from a search beacon having a large beamwidth which is modulated in accordance with a predetermined pulse code, locator means for identifying the position of an operator to be located comprising, in combination:

detector means for sensing the radiation of said search beacon and for producing a detection output in respnse thereto;

means for demodulating said detection output to reproduce said pulse code;

means for storing a predetermined pulse code;

means for comparing said stored code with said reproduced code and for generating a comparison output in response to a match condition;

means responsive to said comparison output for generating an indication signal to indicate to said operator that said locator means is positioned in the path of the radiation of said search beacon;

a corner cube prism for reflecting a portion of the radiation of said search beacon back to said search station;

data input means manually operable by said operator for generating a data input signal; and modulation means for modulating the amount of radiation reflected back to said search station by said corner cube prism in accordance with said data input signal whereby said locator means is adapted to send a data message to said search station via said reflected radiation, said modulation means further including:

a microphone having a first terminal, a first field effect transistor having a gate terminal, a first terminal and a second terminal, said gate terminal being connected to said first terminal of said microphone;

a first resistor having a first and a second end, said first end being connected to said first terminal of said first field effect transistor, and said second end being connected to ground;

a first capacitor having a first and a second end, said first end being connected to said first end of said first resistor;

a second resistor having a first and a second end, said first end being connected to said second end of said first capacitor;

a first transistor having a base, collector and an emitter terminal, said base terminal being connected to said first end of said second resistor, said emitter terminal being connected to ground;

a third resistor having a first and a second end, said first end being connected to said collector terminal of said first transistor and said second end being connected to aid second terminal of said first field effect transistor;

a first single pole double throw switch having a first, a second and a third terminal, said first terminal being connected to said first end of said third resistor;

a fourth resistor having a first and a second end, said first end being connected to said second terminal of said first single pole double throw switch, a second transistor having a base, collector and emitter terminal, said base terminal being connected to said second end of said fourth resistor, and said emitter terminal being connected to ground;

a third transistor having a base, collector, and emitter terminal, said base terminal being connected to said collector terminal of said second transistor, and said collector terminal being connected to ground;

a second capacitor having a first and a second end, said first end being connected to said emitter terminal of said third transistor, a fifth resistor having a first and a second end, said first end being connected to said emitter termminal of said third transistor, a fourth transistor having a base, collector and emitter terminal, said emitter terminal being connected to said second end of said fifth resistor;

a first diode having an anode and a cathode end, said anode end being connected to said base terminal of said fourth transistor, a second diode having an anode and a cathode end, said anode end being connected to said cathode end of said first diode, and said cathode end of said second diode being connected to said collector terminal of said second transistor;

a sixth resistor having a first and a second end, said first end being connected to said anode end of said first diode and said second end being connected to said second end of said third resistor; said second end of said sixth resistor also being connected to said collector terminal of said fouth transistor;

a first variable resistor having a first end, a second end and a middle terminal, said first end being connected to said collector terminal of said fourth transistor, said middle terminal being connected to said second end of said second capacitor, and said second end being connected to ground;

a shutter means positioned adjacent to said corner cube prism having a first and a second terminal, said first terminal being connected to said second end of said second capacitor and said second terminal being connected to ground;

a multivibrator means having an input terminal and an output terminal, said input terminal being connected to said second terminal of said first field effect transistor, said output terminal being connected to said third terminal of said first single pole double throw switch;

a power supply having a first and a second terminal, said first terminal being connected to ground; and a second single pole double throw switch having a first, a second and a third terminal, said first terminal being connected to said input terminal of said multivibrator means, said second terminal being connected to said second terminal of said power supply and said third terminal being connected to said second terminal of said first field effect transistor; and reflector means controllable by said operator for reflecting a portion of the radiation of said search beacon back to said search station.

* * * * *